United States Patent
Trainer et al.

(10) Patent No.: US 8,395,346 B2
(45) Date of Patent: Mar. 12, 2013

(54) SYNCHRONOUS ELECTRICAL MACHINE

(75) Inventors: David R Trainer, Derby (GB); John J A Cullen, Derby (GB); Alan J Mitcham, Ponteland (GB); Andrew M Cross, Stafford (GB); Andrew J Forsyth, Manchester (GB); Ahmed A-M Abdel-Hafez, Assint (EG)

(73) Assignee: Rolls-Royce PLC, London (GB)

( * ) Notice: Subject to any disclaimer, the term of this patent is extended or adjusted under 35 U.S.C. 154(b) by 604 days.

(21) Appl. No.: 12/451,819

(22) PCT Filed: Jun. 13, 2008

(86) PCT No.: PCT/GB2008/002054
§ 371 (c)(1),
(2), (4) Date: Dec. 2, 2009

(87) PCT Pub. No.: WO2009/007671
PCT Pub. Date: Jan. 15, 2009

(65) Prior Publication Data
US 2010/0117569 A1  May 13, 2010

(30) Foreign Application Priority Data
Jul. 12, 2007  (GB) .................................. 0713527.0

(51) Int. Cl.
*H02P 3/18* (2006.01)
(52) U.S. Cl. ...................................... 318/700; 318/701
(58) Field of Classification Search .................. 318/700, 318/701, 629, 140
See application file for complete search history.

(56) References Cited

U.S. PATENT DOCUMENTS

| | | | | |
|---|---|---|---|---|
| 4,484,115 A | * | 11/1984 | Takahashi | 318/400.41 |
| 4,949,362 A | * | 8/1990 | Gaubatz | 376/259 |
| 6,058,031 A | * | 5/2000 | Lyons et al. | 363/67 |
| 6,101,109 A | * | 8/2000 | Duba et al. | 363/71 |
| 6,791,204 B2 | * | 9/2004 | Sarlioglu et al. | 290/52 |
| 7,276,871 B2 | * | 10/2007 | Ganev et al. | 318/434 |
| 7,663,849 B2 | * | 2/2010 | Shah et al. | 361/20 |
| 2003/0146025 A1 | | 8/2003 | Kamen et al. | |
| 2007/0030606 A1 | | 2/2007 | Ganev et al. | |
| 2007/0086226 A1 | * | 4/2007 | Mavier et al. | 363/132 |

FOREIGN PATENT DOCUMENTS

GB  1166196  10/1969
WO  WO 95/02120  1/1995

OTHER PUBLICATIONS

International Search Report for International Application No. PCT/GB2008/002054, issued Jan. 23, 2009.

(Continued)

*Primary Examiner* — Rina Duda
(74) *Attorney, Agent, or Firm* — Oliff & Berridge, PLC

(57) ABSTRACT

A synchronous electrical machine having a plurality of phases, a detecting unit arranged to detect a fault in at least one of the phases of the synchronous electrical machine, an isolating unit arranged to isolate the at least one phase of the synchronous electrical machine with the fault, a phase shift unit arranged to produce a controlled phase shift between the voltage and the current within the remaining phases of the synchronous electrical machine to adjust the phase angle and magnitude of the second harmonic powers produced by the remaining phases of the synchronous electrical machine such that the vector sum of the second harmonic power vectors of the remaining phases of the synchronous electrical machine is zero.

22 Claims, 4 Drawing Sheets

OTHER PUBLICATIONS

Written Opinion of the International Searching Authority for International Application No. PCT/GB2008/002054, issued Jan. 23, 2009.

British Search Report for Application No. GB 0713527.0, issued Sep. 27, 2007.

* cited by examiner

Fundamental Components (separated by 108°)

2nd. Harmonic Components
(separated by 216°)

14 Degree lead & lag
AC (machine) side

2nd. Harmonic, DC
side currents

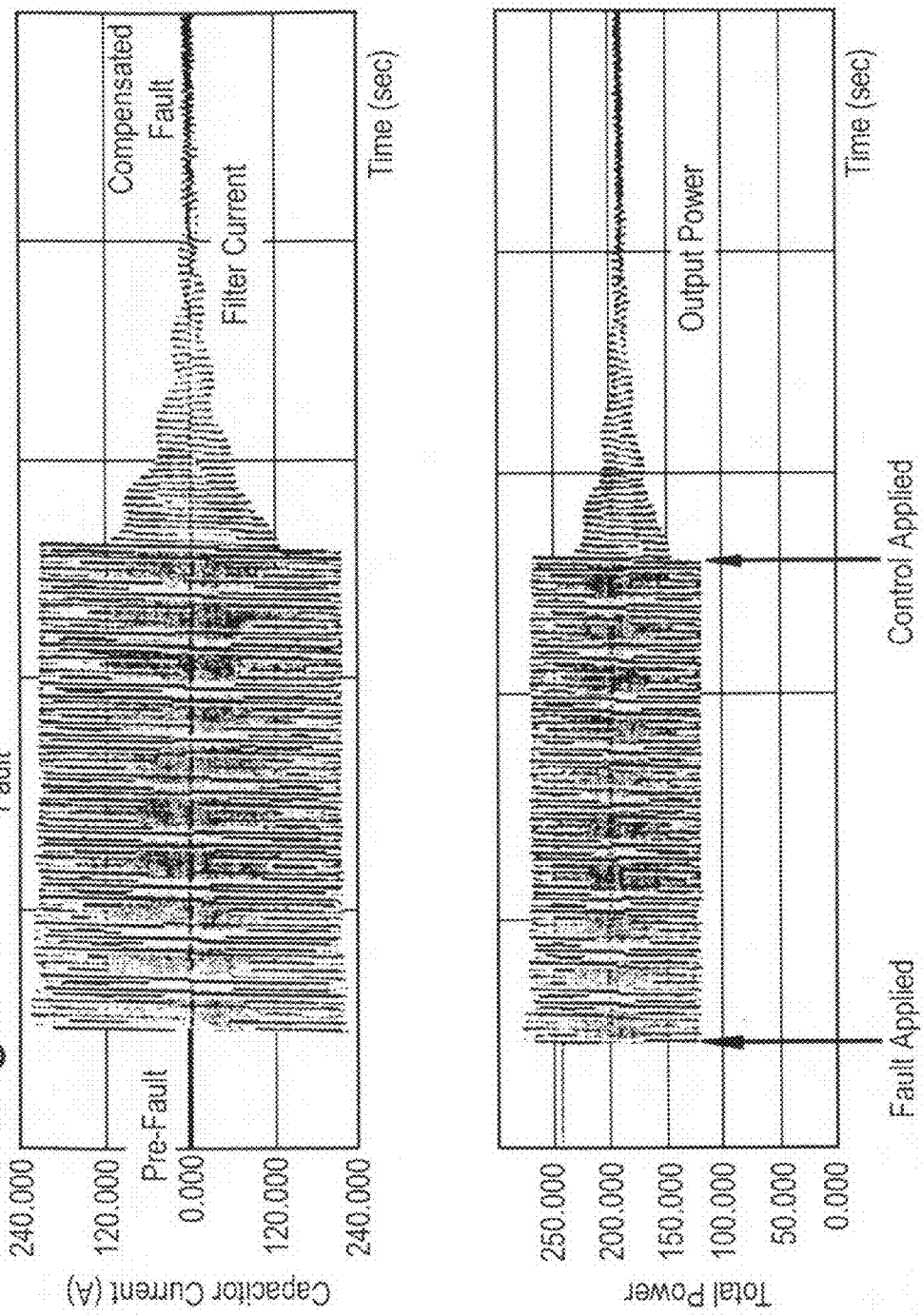

SYNCHRONOUS ELECTRICAL MACHINE

The present invention relates to a synchronous electrical machine, particularly a synchronous electrical machine, e.g. an electrical starter/generator, for a gas turbine engine.

BACKGROUND

In current aerospace applications electrical power is generated using traditional wound-field synchronous electrical machines. These synchronous electrical machines are coupled to a rotor of the gas turbine engine using a complex mechanical transmission system, for example a radial drive shaft from the gas turbine engine rotor and a gearbox. These synchronous electrical machines are mounted on the gas turbine engine in a position where they are readily accessible for maintenance and/or replacement if there is a fault with the synchronous electrical machine.

It is proposed to embed the synchronous electrical machine in the gas turbine engine, for example the rotor of the synchronous electrical machine is coupled to the rotor of the gas turbine engine. The advantage of the embedded synchronous electrical machine is that it allows the complex mechanical transmission system to be removed, or greatly simplified, providing significant operational and efficiency benefits. However, these embedded synchronous electrical machines are difficult to remove and replace if there is a fault/failure. EP0659234B1 discloses the use of coupled synchronous electrical machines and embedded synchronous electrical machines in gas turbine engines.

It is desirable to use the synchronous electrical machine to start the gas turbine engine, as well as to generate electricity, as this removes the reliance on an air starter and provides additional engine design benefits. A power electronic interface is provided with the synchronous electrical machine to enable the synchronous electrical machine to act as a motor rather than a generator. Electrical generator systems utilising power electronic converters enable very high power dense machine technologies, for example permanent magnet designs to be employed in the asynchronous electrical machine, which gives further size and weight benefits compared to traditional synchronous electrical machines.

SUMMARY

There is a need for high reliability and fault tolerant embedded synchronous electrical machines for aircraft gas turbine engines.

Accordingly the present invention seeks to provide a novel synchronous electrical machine, which reduces, preferably overcomes, the above-mentioned problem.

Accordingly the present invention provides a synchronous electrical machine comprising a plurality of phases, detecting means arranged to detect a fault in at least one of the phases of the synchronous electrical machine, isolating means arranged to isolate the at least one phase of the synchronous electrical machine with the fault, phase shift means arranged to produce a controlled phase shift between the voltage (emf) and the current within the remaining phases of the synchronous electrical machine to adjust the phase angle and magnitude of the second harmonic powers produced by the remaining phases of the synchronous electrical machine such that the vector sum of the second harmonic power vectors of the remaining phases of the synchronous electrical machine is zero.

Preferably the phase shift means comprises a plurality of converters, each phase having a respective converter.

Preferably the synchronous electrical machine is a motor/generator.

Preferably the synchronous electrical machine is a starter/generator.

Preferably the synchronous electrical machine comprises a permanent magnet electrical machine.

Preferably the synchronous electrical machine comprises a rotor having a plurality of circumferentially spaced permanent magnets and a stator having a plurality of electrical coils.

Alternatively the synchronous electrical machine comprises a switched reluctance electrical machine.

Preferably the synchronous electrical machine comprises five phases. The five phases may be arranged at 36, 72 or 108 electrical degrees apart.

Typically the five phases are arranged at 108 electrical degrees apart and the phase shift means is arranged to produce a +/−14 electrical degree phase shift between the voltage (emf) and the current within each of the remaining phases of the synchronous electrical machine.

The present invention also provides a method of operating a synchronous electrical machine comprising a plurality of phases, the method comprising detecting a fault in at least one of the phases of the synchronous electrical machine, isolating the at least one phase of the synchronous electrical machine with the fault, producing a controlled phase shift between the voltage (emf) and the current within the remaining phases of the synchronous electrical machine to adjust the phase angle and magnitude of the second harmonic powers produced by the remaining phases of the synchronous electrical machine such that the vector sum of the second harmonic power vectors of the remaining phases of the synchronous electrical machine is zero.

Preferably each phase having a respective converter, the method comprising using the converters to produce the controlled phase shift.

Preferably the synchronous electrical machine is a motor/generator.

Preferably the synchronous electrical machine is a starter/generator.

Preferably the synchronous electrical machine comprises a permanent magnet electrical machine.

Alternatively the synchronous electrical machine comprises a switched reluctance electrical machine.

Preferably the synchronous electrical machine comprises a rotor having a plurality of circumferentially spaced permanent magnets and a stator having a plurality of electrical coils.

Preferably the synchronous electrical machine comprising five phases.

Preferably the five phases are arranged at 36, 72 or 108 electrical degrees apart.

Typically the five phases are arranged at 108 electrical degrees apart and producing a +/−14 electrical degree phase shift between the voltage (emf) and the current within each of the remaining phases of the synchronous electrical machine.

Embodiments of the invention will be more fully described by way of example with reference to the accompanying drawings.

BRIEF DESCRIPTION OF THE DRAWINGS

FIG. 8 is a graph showing the DC side capacitor current and total power before and after a fault in one of the phases and after phase shifting according to the present invention.

DETAILED DESCRIPTION OF EMBODIMENTS

Figure 1:
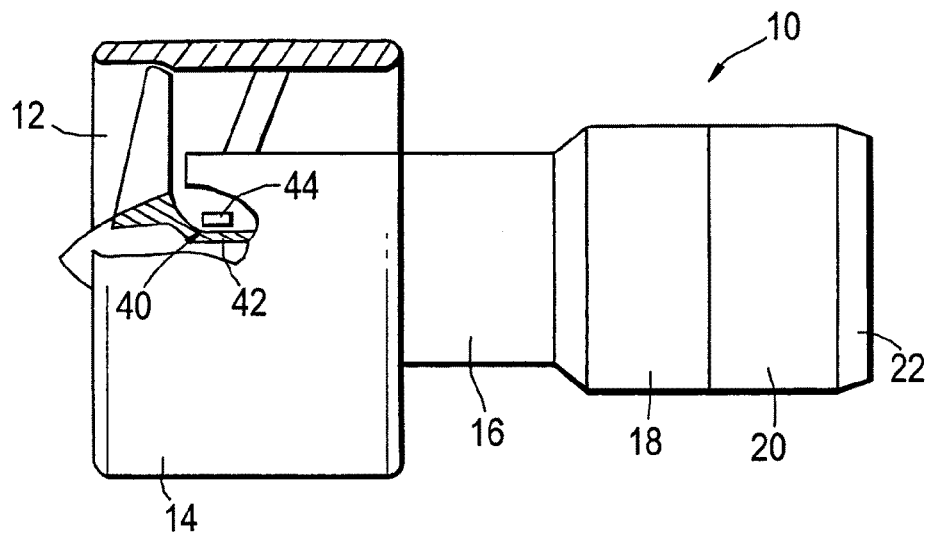
FIG. 1 shows a turbofan gas turbine engine having a synchronous electrical machine according to the present invention.

A turbofan gas turbine engine 10, as shown in FIG. 1, comprises an intake 12, a fan section 14, a compressor section 16, a combustion section 18, a turbine section 20 and an exhaust 22. The turbine section 20 comprises a high pressure turbine, an intermediate pressure turbine and a low pressure turbine. The compressor section comprises an intermediate pressure compressor and a high pressure compressor and the fan section comprises a fan. The high pressure turbine is arranged to drive the high pressure compressor via a first shaft, the intermediate pressure turbine is arranged to drive the intermediate pressure compressor via a second shaft and the low pressure turbine is arranged to drive the fan via a third shaft. A synchronous electrical machine 40 is embedded in the turbofan gas turbine engine 10.

Figure 2:
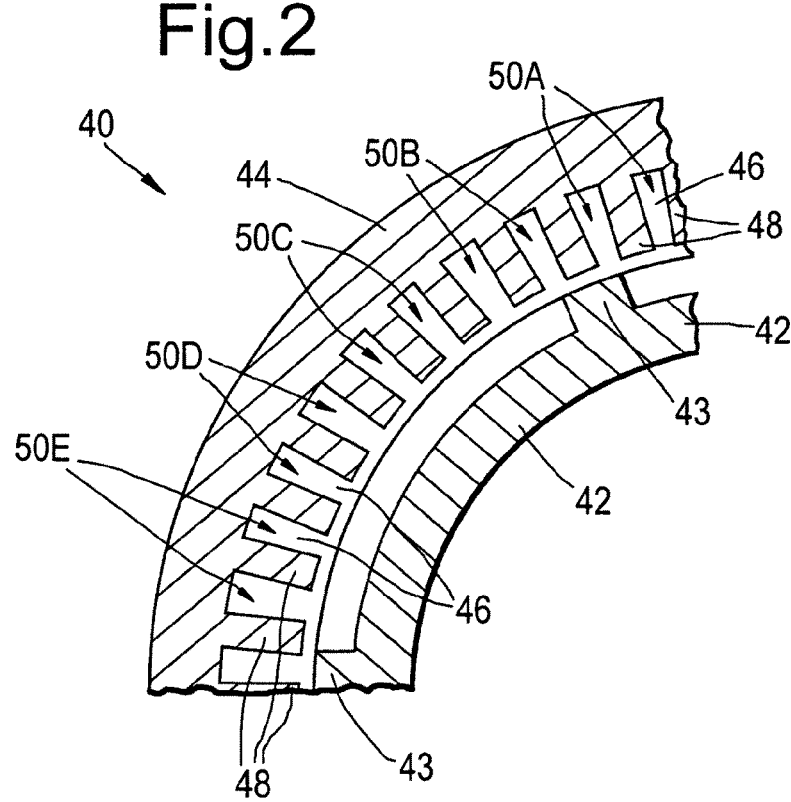
FIG. 2 shows a part cross-sectional view through the synchronous electrical machine shown in FIG. 1.

The synchronous electrical machine 40, as shown more clearly in FIG. 2, comprises a rotor 42 having a plurality of circumferentially spaced permanent magnets 43 on the periphery of the rotor 42 and a stator 44 having a plurality of electrical coils 46 arranged on radially inwardly extending teeth 48 on the stator 44. The coils 46 are arranged as a plurality of power generating phases. The rotor 42 of the synchronous electrical machine 40 is driven by the third shaft of the turbofan gas turbine engine 10 in this arrangement, but may equally well be driven by the second shaft or the first shaft of the turbofan gas turbine engine 10.

The synchronous electrical machine 40, in particular a permanent magnet electrical generator comprises a plurality of identical phases 50A, 50B, 50C, 50D and 50E, which are magnetically and electrically isolated from each other such that a fault in any one of the phases does not affect any of the other phases. The electrical impedance of these phases 50A, 50B, 50C, 50D and 50E of the permanent magnet electrical generator 40 is deliberately arranged to be high to limit the fault current that occurs during a short circuit condition enabling the system to continue to operate safely within designed thermal limits.

The magnitude of the alternating voltage produced at the terminals of the permanent magnet electrical generator 40 changes with the speed of rotation of the rotor of the permanent magnet electrical machine 40, and hence the speed of rotation of the rotor of the turbofan gas turbine engine 10, and the source impedance causes added regulation effects as the electrical load changes. The multi-phase nature of such a permanent magnet electrical generator 40 means that the output phases have to be combined to enable the output power to be practically distributed to the electrical load centres.

Figure 3:
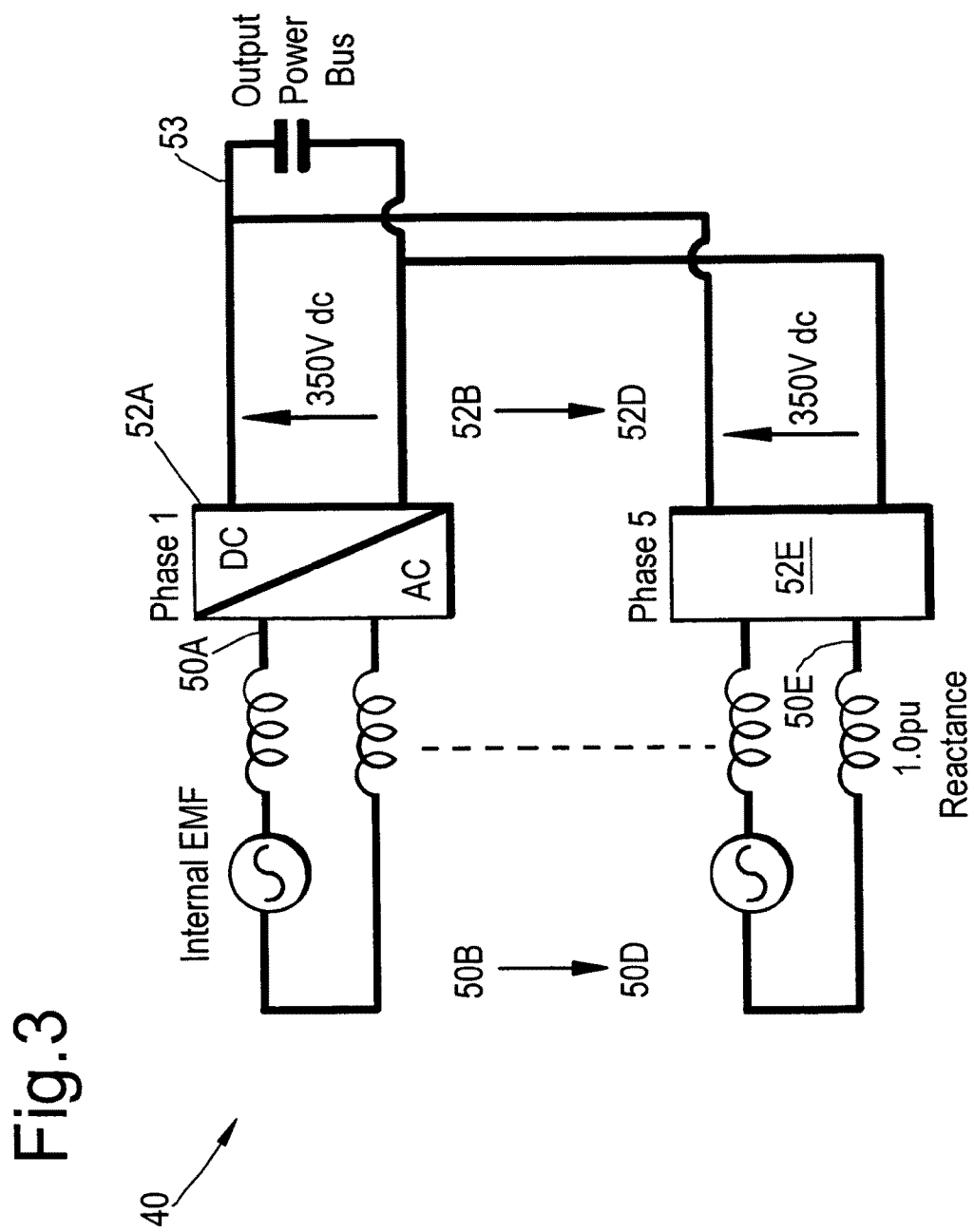
FIG. 3 shows a diagrammatic view of a synchronous electrical machine and power electronic converter according to the present invention.

Each phase 50A, 50B, 50C, 50D and 50E of the synchronous electrical machine 40 is provided with a respective one of a plurality of power electronic AC to DC converters 52A, 52B, 52C, 52D and 52E. The combination of the power generator phases and the voltage regulation issues are accommodated using these power electronic AC to DC converters 52A, 52B, 52C, 52D and 52E, which enable the systems to be combined at a common DC bus 53 as shown in FIG. 3.

It is known that a single phase electrical generator provides electrical power, which pulses at a second harmonic frequency compared to the electrical frequency of the voltage and current produced by each phase of the synchronous electrical machine.

If voltage=V sin ωt and Current=I sin ωt, assuming unity power factor, the power is the product of voltage and current and is given by VI[1−cos 2 ωt]/2, giving a constant term and a second harmonic term. A large capacitor is therefore required in order to filter out the second harmonic term to provide a near DC output voltage. If the DC voltage is constant as would be the case where a large filter capacitor is connected at the converter output, a second harmonic component of DC current is forced to flow to satisfy the power balance. In the design of such systems, the electrical angle between the adjacent phases is carefully controlled to ensure the combined power output is constant and is achieved by choosing appropriate angles such that the second harmonic contributions from all of the phases effectively cancel to zero.

Land based synchronous electrical machines utilise electrolytic capacitors at the DC bus interface, which are particularly capacitance dense resulting in a capacitor with a moderate size and weight penalty. However, electrolytic capacitors are not generally available at aerospace quality levels, because of limitations upon operating temperature, capacitance stability, life limitations and orientation limitations. Therefore, less capacitive dense technologies such as film-foil capacitances are required, which leads to a very large weight and size penalty in a practical system. A synchronous electrical machine with a combined constant output power means that the value of the DC capacitor may be significantly reduced whilst maintaining a high degree of power quality, minimal ripple component, to the attached electrical loads. Reducing the filter components also reduces the stored energy in the electrical network, thereby giving the added advantage of lower fault current contributed during faults on the electrical network.

The synchronous electrical machine 40 is optimised for its normal operating condition, i.e. no fault. For example the synchronous electrical machine 40 has five phases 50A, 50B, 50C, 50D and 50E and the phases are arranged at 36, 72 or 108 electrical degrees apart. This is fixed in the design of the synchronous electrical machine 40.

Such a synchronous electrical machine 40 works well in normal operation when there isn't a fault. However, once a fault occurs, the associated faulted phase of the synchronous electrical machine 40 is isolated, the combined constant power output characteristic is lost. This occurs because the second harmonic components of the current contributed from the remaining four phases of the synchronous electrical machine 40 no longer add to zero. This is a serious disadvantage, because large and expensive energy storage components are then required at the DC output to provide adequate filtering. This problem is made worse for aerospace applications due to the inability to use electrolytic capacitors.

Figure 4:
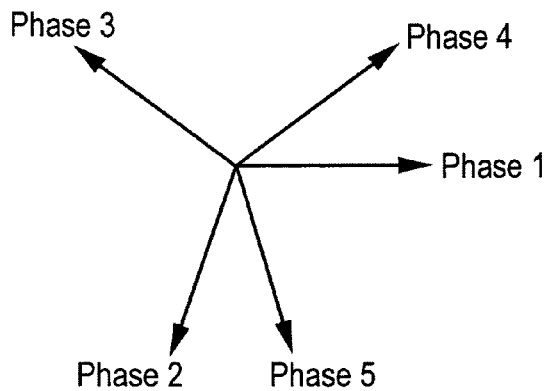
FIG. 4 is a graph showing the vector relationship for the AC side emfs and currents for a five phase synchronous electrical machine in normal operation.
Figure 5:
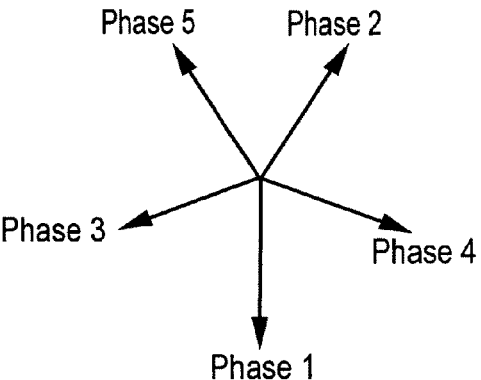
FIG. 5 is a graph showing the second harmonic power vectors for a five phase synchronous electrical machine in normal operation.

FIG. 4 shows the vector relationship for the AC side emfs and currents for a five phase synchronous electrical machine 40 in normal operation. The electrical phases are separated by 108 electrical degrees. FIG. 5 shows the DC side second harmonic current vectors for a five phase synchronous electrical machine 40 in normal operation. The second harmonic current vectors are separated by 216 electrical degrees and have the same magnitude and therefore it is seen that the vector sum of the second harmonic current vectors add up to zero. Clearly if one of the phases, for example phase five, has a fault, the DC side cancellation is lost and a large second harmonic current remains, which would therefore require a significant DC capacitance to adequately smooth the voltage ripple created.

In the present invention the converters are arranged to restore the cancellation of the DC second harmonic currents when the circuit configuration is changed during a fault condition. For example if there is a fault in phase five 50E, the converter 52E detects a fault in phase five 50E of the synchronous electrical machine 40 and the converter 52E is arranged to isolate phase five 50E of the synchronous electrical machine 40. The remaining converters 52A, 52B, 52C and 52D are arranged to produce a controlled phase shift between the voltage (emf) and the current within the remaining phases 50A, 50B, 50C and 50D of the synchronous electrical machine 40 to adjust the phase angle and magnitude of the second harmonic currents produced by the remaining phases 50A, 50B, 50C and 50D of the synchronous electrical machine 40 such that the vector sum of the second harmonic current vectors of the remaining phases 50A, 50B, 50C and 50D of the synchronous electrical machine 40 is approximately zero.

Figure 6:
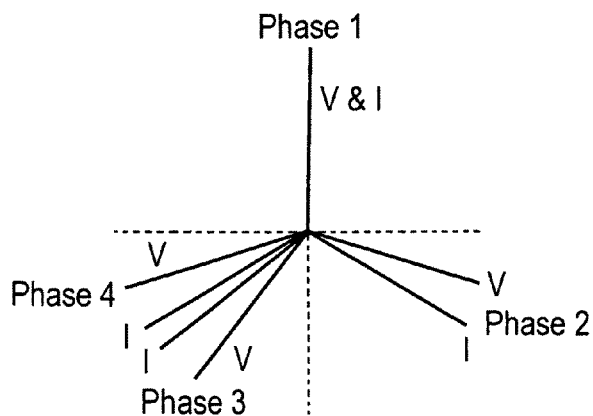
FIG. 6 is a graph showing the vector relationship for the AC side emfs and currents for a five phase synchronous electrical machine according to the present invention when one of the phases is isolated due to a fault.
Figure 7:
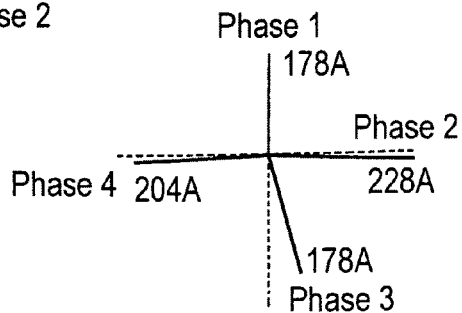
FIG. 7 is a graph showing the second harmonic current vectors on the DC side of the power electronic converter for a five phase synchronous electrical machine according to the present invention when one of the phases is isolated due to a fault.

FIG. 6 shows the vector relationship for the AC side emfs and currents for a five phase synchronous electrical machine 40 according to the present invention when phase five is isolated due to a fault. The converters 52A, 52B, 52C and 52D are arranged to move the phase angle of the AC side currents by +/−14 electrical degrees with respect to the generated emf in order to restore the second harmonic cancellation at the DC interface when phase five 50E is isolated as a result of a fault. For the first phase, the current and voltage are in phase. For the second phase the current lags the voltage, for the third phase the current lags the voltage and for the fourth phase the current leads the voltage. FIG. 7 shows the DC side second harmonic current vectors for a five phase synchronous electrical machine 40 according to the present invention when the fifth phase 50E is isolated due to a fault, note the different magnitudes of the second harmonic current components for the different phases, first phase and third phase 178A, second phase 228A and fourth phase 204A. Thus, in the present invention each of the converters 52A, 52B, 52C and 52D shifts the current relative to the voltage for the respective phase 50A, 50B, 50C and 50D.

The effect of using the converters 52A, 52B, 52C, 52D and 52E to isolate one, or more, of the phases and to move the phase angle of the AC side currents with respect to the generated emf to make the second harmonic currents cancel to zero is illustrated in FIG. 8. FIG. 8 is a computer simulation showing the DC side capacitor current and total power before and after a fault in phase five 50E of the synchronous electrical machine 40 and after phase shifting according to the present invention. It is seen that there is a considerable reduction in the ripple current flow, which has a significant effect on the requirements for the filtering capacitor. The figure is for illustration only to highlight the ripple current for a synchronous electrical machine 40 with and without the present invention. In practice there is a finite, but small, period of time between detection of a fault in a phase and the converters 52A to 52E isolating the fault in the faulted phase and phase shifting in the remaining phases. This creates a very short term disturbance to the electrical power bus, but this is preferable to the steady state disturbance created without the present invention.

It is known that altering the phase angle of the currents flowing in to the phases of a synchronous electrical machine 40 may have a small effect on the magnetic flux distribution and performance of the synchronous electrical machine 40. In tests we have performed, no major detrimental effect on the synchronous electrical machine 40 operation or performance was detected.

Although the present invention has been described with reference to a fault in a single phase and isolation of the single phase, the present invention is equally applicable if there are faults in more than one phase and isolation of more than one phase.

Although the present invention has been described with reference to a permanent magnet synchronous electrical machine the present invention is also applicable to a switched reluctance synchronous electrical machine or other electrical machines.

Although the present invention has been described with reference to a turbofan gas turbine engine, the present invention is equally applicable to other aero gas turbine engines e.g. turbojet, turbopropeller or turboshaft gas turbine engines and also to marine and industrial gas turbine engines.

Although the present invention has been described with reference to a three shaft gas turbine engine it is equally applicable to a two shaft gas turbine engine or a single shaft gas turbine engine.

Although the present invention has been described with reference to the synchronous electrical machine being embedded in the gas turbine engine it is equally possible to apply the present invention to synchronous electrical machines at other positions on the gas turbine engine.

The present invention is also applicable for synchronous electrical machines for other applications.

The invention claimed is:

1. A synchronous electrical machine, comprising:
a plurality of phases,
a detecting means arranged to detect a fault in at least one of the phases of the synchronous electrical machine,
an isolating means arranged to isolate the at least one phase of the synchronous electrical machine with the fault, and
a phase shift means arranged to produce a controlled phase shift between the voltage and the current within the remaining phases of the synchronous electrical machine to adjust the phase angle and magnitude of the second harmonic powers produced by the remaining phases of the synchronous electrical machine such that the vector sum of the second harmonic power vectors of the remaining phases of the synchronous electrical machine is zero.

2. The synchronous electrical machine as claimed in claim 1, wherein the phase shift means comprises a plurality of converters, each phase having a respective converter.

3. The synchronous electrical machine as claimed in claim 1, wherein the synchronous electrical machine is a motor/generator.

4. The synchronous electrical machine as claimed in claim 3, wherein the synchronous electrical machine is a starter/generator.

5. The synchronous electrical machine as claimed in claim 1, wherein the synchronous electrical machine comprises a permanent magnet electrical machine.

6. The synchronous electrical machine as claimed in claim 1, wherein the synchronous electrical machine comprises a switched reluctance electrical machine.

7. The synchronous electrical machine as claimed in claim 5, wherein the synchronous electrical machine comprises a rotor having a plurality of circumferentially spaced permanent magnets and a stator having a plurality of electrical coils.

8. The synchronous electrical machine as claimed in claim 1, wherein the synchronous electrical machine comprises five phases.

9. The synchronous electrical machine as claimed in claim 8, wherein the five phases are arranged at 36, 72 or 108 electrical degrees apart.

10. The synchronous electrical machine as claimed in claim 9, wherein the five phases are arranged at 108 electrical degrees apart and the phase shift means is arranged to produce a +/−14 electrical degree phase shift between the voltage and the current within each of the remaining phases of the synchronous electrical machine.

11. A gas turbine engine comprising the synchronous electrical machine as claimed claim 1,
the synchronous electrical machine including a rotor, the gas turbine engine having a shaft, and the shaft being arranged to drive the rotor.

12. A synchronous electrical machine as claimed in claim 1, wherein the phases are electrically isolated from each other.

13. A method of operating a synchronous electrical machine comprising a plurality of phases, the method comprising:
detecting a fault in at least one of the phases of the synchronous electrical machine;
isolating the at least one phase of the synchronous electrical machine with the fault; and
producing a controlled phase shift between the voltage and the current within the remaining phases of the synchronous electrical machine to adjust the phase angle and magnitude of the second harmonic powers produced by the remaining phases of the synchronous electrical machine such that the vector sum of the second harmonic power vectors of the remaining phases of the synchronous electrical machine is zero.

14. The method as claimed in claim 13, wherein each phase has a respective converter, and the controlled phase shift is produced by the converters.

15. The method as claimed in claim 13, wherein the synchronous electrical machine is a motor/generator.

16. The method as claimed in claim 15, wherein the synchronous electrical machine is a starter/generator.

17. The method as claimed in claim 13, wherein the synchronous electrical machine comprises a rotor having a plurality of circumferentially spaced permanent magnets and a stator having a plurality of electrical coils.

18. The method as claimed in claim 13, wherein the synchronous electrical machine comprises five phases.

19. The method as claimed in claim 18, wherein the five phases are arranged at 36, 72 or 108 electrical degrees apart.

20. The method as claimed in claim 19, wherein the five phases are arranged at 108 electrical degrees apart, and the method comprises producing a +/−14 electrical degree phase shift between the voltage and the current within each of the remaining phases of the synchronous electrical machine.

21. The method as claimed in claim 19, wherein the five phases are arranged at 108 electrical degrees apart, the method comprising:
maintaining the current and the voltage in phase in a first phase of the synchronous electrical machine; and
producing a +/−14 electrical degree phase shift between the voltage and the current within each of the remaining three phases of the synchronous electrical machine, such that the current lags the voltage in a second phase, the current lags the voltage in a third phase and the current leads the voltage in a fourth phase.

22. The method as claimed in claim 13, wherein the phases are electrically isolated from each other.

* * * * *